US00RE37318B1

(19) United States
(12) Reissued Patent
Porter

(10) Patent Number: US RE37,318 E
(45) Date of Reissued Patent: Aug. 14, 2001

(54) TRIBRACH DEVICE

(75) Inventor: Sonny J. Porter, Pine Bluffs, WY (US)

(73) Assignee: Site Manufacturing, Inc., Bella Vista, CA (US)

(21) Appl. No.: 08/825,365

(22) Filed: Mar. 28, 1997

Related U.S. Patent Documents

Reissue of:
(64) Patent No.: 5,501,018
Issued: Mar. 26, 1996
Appl. No.: 08/279,742
Filed: Jul. 22, 1994

(51) Int. Cl.[7] ..... G01C 5/00; G01C 15/00
(52) U.S. Cl. ..... 33/290; 33/227; 33/277; 33/299; 33/DIG. 21
(58) Field of Search ..... 33/227, 250, 277, 33/284, 285, 290, 291, 292, 299, DIG. 21; 356/149, 250

(56) References Cited

U.S. PATENT DOCUMENTS 2,775,423 * 12/1956 Strass ..... 33/299
2,922,225 * 1/1960 Fatkin et al. ..... 33/299
3,471,234 * 10/1969 Studebaker .
3,931,947 * 1/1976 Tagnon ..... 33/299
4,309,010 * 1/1982 Posso .
4,832,296 * 5/1989 Schnepp .
5,159,760 * 11/1992 Spiegel ..... 33/227

FOREIGN PATENT DOCUMENTS

244570 * 3/1912 (DE) .
219821 * 8/1924 (GB) .
862263 * 3/1961 (GB) .
1276816 * 6/1972 (GB) .
708153 * 1/1980 (SU) .

* cited by examiner

*Primary Examiner*—G. Bradley Bennett

(57) ABSTRACT

An improved tribrach device for attaching an optical sighting instrument to a support such as a tripod. The tribrach device includes a pivotable locking ring for securing the legs of the sighting instrument to the tribrach. The locking ring is biased towards its locked position and is easily unlocked when desired. A laser beam is projected upwardly and downwardly along a vertical axis.

22 Claims, 5 Drawing Sheets

TRIBRACH DEVICE

Matter enclosed in heavy brackets [ ] appears in the original patent but forms no part of this reissue specification; matter printed in italics indicates the additions made by reissue.

FIELD OF THE INVENTION

This invention relates to tribrach devices. More particularly, this invention relates to an improved tribrach device for supporting an optical sighting device, i.e., for surveying purposes.

BACKGROUND OF THE INVENTION

Optical instruments are used for surveying purposes and are supported on, and attached to, the upper end of a tripod by means of a tribrach device. The tribrach is secured on its underside to the upper end of the tripod, and the optical sighting instrument is detachably secured to the top of the tribrach device.

With a conventional tribrach device, the three depending legs of an optical sighting device are received in three openings in the tribrach, after which the legs are locked by rotating a small tab or lever to move a cam against the legs in the openings. One of the three openings in the tribrach is elongated to compensate for any irregularities in centering the device in the tribrach. This allows the device being fastened to the tribrach to deviate in position. Such a mechanism for locking the legs in the tribrach device is cumbersome and often fails to provide a secure locking of the legs in the tribrach. Thus, during windy conditions, the optical instrument can become loosened because the lock mechanism does not securely hold the legs of the instrument in the receiving openings in the tribrach. Also, the lever on the locking mechanism is difficult to operate while wearing gloves (e.g., during cold weather).

Another problem associated with the use of optical sighting instruments is that they must be vertically aligned over a control point (e.g., a ground mark, stake, monument, etc.). This can be a time-consuming procedure.

Recently, U.S. Pat. No. 5,159,760 described a device for aligning a geodetic instrument over a defined ground mark using a collimated laser beam in a manner such that the vertical distance between the defined ground mark and the sighting line of the geodetic instrument can be measured. Such device does not cure the problems associated with locking the geodetic instrument to the tribrach. Also, the device is not suitable for use in subterranean situations where it is necessary to align an optical sighting device vertically beneath a marker which is located above the instrument (e.g., where the marker is located on the ceiling of a tunnel).

Yet another problem or disadvantage which is common in conventional tribrachs is that they are composed of a cast material which is prone to temperature fluctuations and are also easily damaged (even with minor impacts).

U.S. Pat. No. 3,471,234 describes a laser beam projector for use in surveying operations. Such patent does not describe a tribrach having the advantages provided by the present invention.

U.S. Pat. No. 4,309,010 describes a tripod with an adjustable support surface for supporting various types of objects (e.g., cameras, projection apparatus, geodetic instruments, antennas, etc.). This patent does not describe a tribrach having the advantages provided by this invention.

U.S. Pat. No. 4,832,296 describes a giant tripod assembly for supporting laser beam generators. This patent does not describe a tribrach of the type provided by this invention.

There has not heretofore been provided a tribrach device having the advantages provided by the present invention.

SUMMARY OF THE INVENTION

In accordance with the present invention there is provided an improved tribrach device which includes a laser adapted to project a light beam vertically down to a ground point and is also adapted to project a light beam vertically upward to a reference marker located above an optical sighting instrument. Further, the improved tribrach device includes locking means for easily and securely locking the legs or pins of an optical sighting instrument to the tribrach device. The locking means is very easy to operate, even while wearing gloves. Also, the locking means securely locks the legs or pins of the optical sighting instrument to the tribrach so that the instrument remains very secure even during very windy conditions. The locking means also aligns the instrument with the tribrach device.

The tribrach is composed of a rigid and durable material. Consequently, it can easily withstand impact without danger of it breaking or being otherwise damaged.

Other advantages of the tribrach of this invention will be apparent from the following detailed description and the accompanying claims.

BRIEF DESCRIPTION OF THE DRAWINGS

The invention is described in more detail hereinafter with reference to the accompanying drawings wherein like reference numbers refer to the same parts throughout the several figures and wherein.

DETAILED DESCRIPTION OF THE INVENTION

Figure 1:
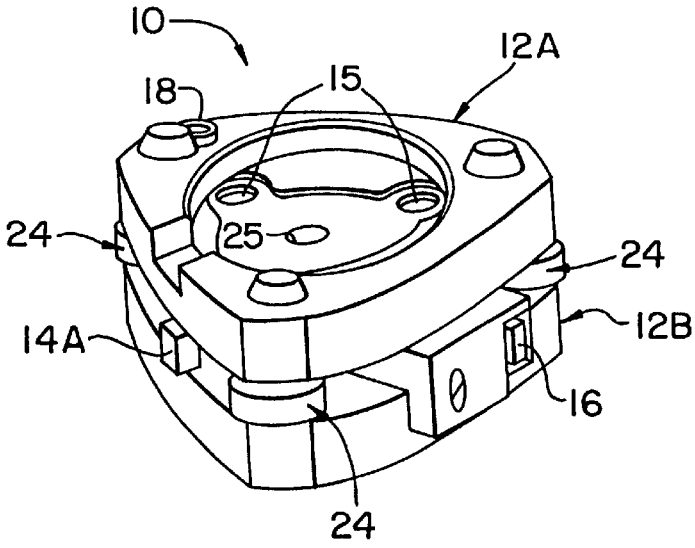
FIG. 1 is a perspective view of a preferred embodiment of a tribrach device of the invention.
Figure 4:
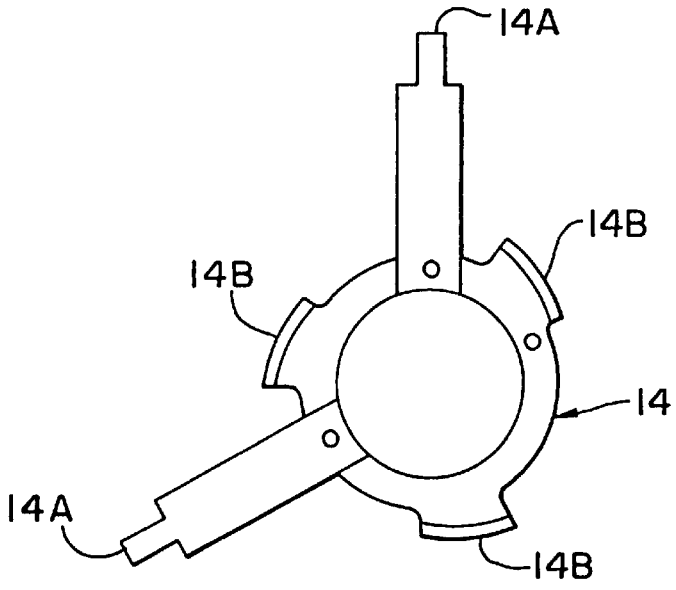
FIG. 4 is a top view of the locking means used in the tribrach device of the invention.
Figure 2:
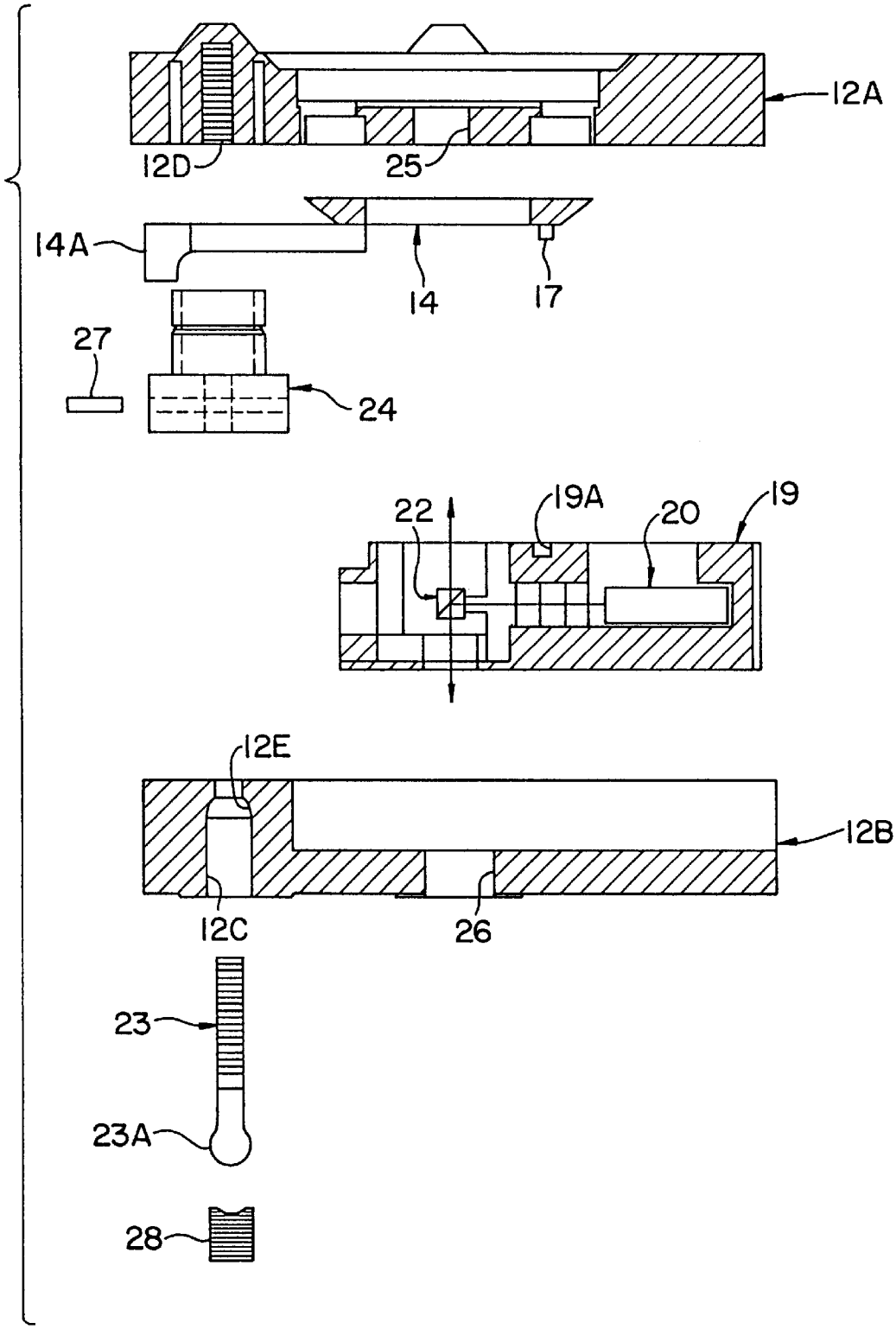
FIG. 2 is an explosion cross-section view showing the tribrach device of FIG. 1.
Figure 3:
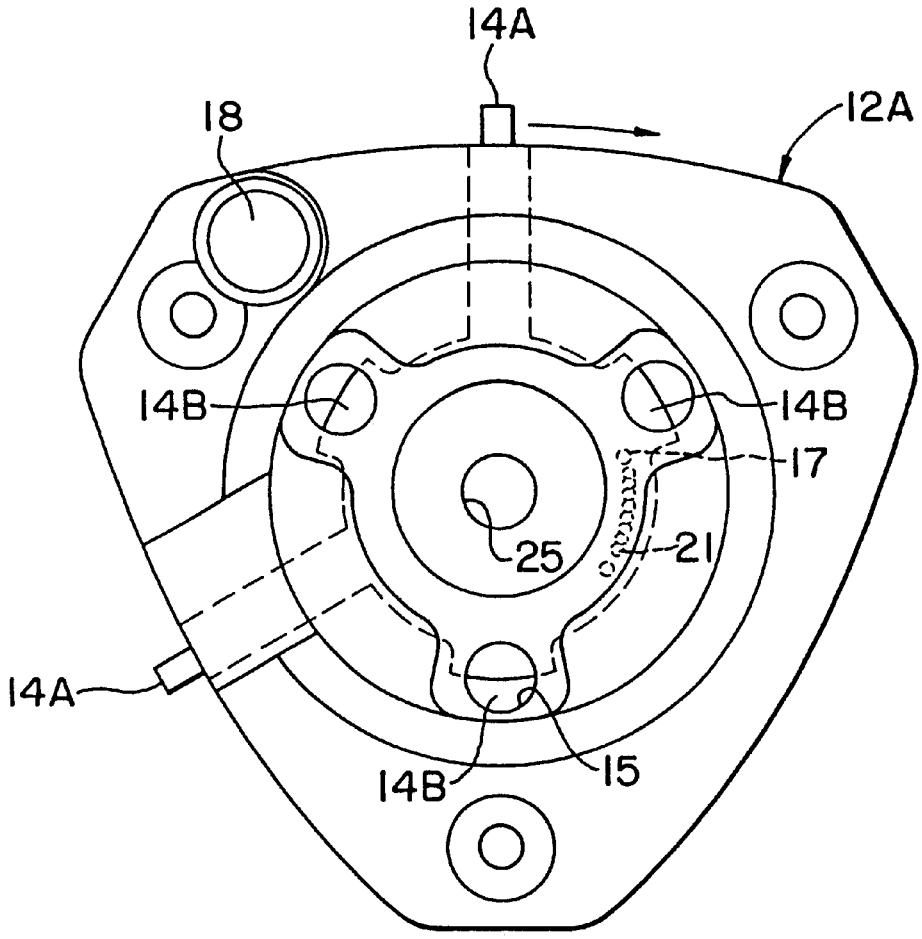
FIG. 3 is a top view of the tribrach device of FIG. 1.

In the drawings there is shown an improve tribrach device 10 of the invention which comprises upper body member 12A and lower body member 12B. Preferably each body member is composed of a very durable and rigid material which is impact-resistant and is able to withstand wide temperature variations without damage. The thickness of each body member is preferably about one inch.

Preferred material for the tribrach device is tempered aluminum (i.e., "T" or "P" series aluminum) which is aircraft grade as opposed to cast or forged aluminums. It is also possible to use materials such as titanium or other such durable materials. Preferably non-ferrous materials are used so as to avoid corrosion.

The upper body member 12A includes three precision machined openings 15 to receive the three pins or legs of an optical sighting device. The diameter of the openings may vary, so long as all of such openings in the tribrach have the same diameter (e.g., 0.5 inch). The openings are equidistantly spaced.

A leveling bubble 18 is positioned in a recess in the upper surface of the body member 12A. The leveling bubble is secured in the recess and is not movable. It is press-fitted into the recess.

The locking means in the tribrach comprises a ring 14 having three outwardly-projecting locking lugs 14B equidistantly spaced at the periphery of the ring. Each locking lug includes an outer edge which is referred to herein as a spiral curve which serves to center the pins or legs of the sighting device relative to the tribrach device.

A downwardly-projecting pin 17 near the periphery of the ring 14 is received in a opening 19A in member 19 which is sandwiched between upper and lower body members 12A and 12B. A coil spring 21 biases the ring in a manner such that the ring rotates in a horizontal plane (in the direction shown by the arrow) to a normally-locked position.

Preferably there are at least two levers or handles 14A projecting outwardly from the periphery of the ring to enable a workman to easily rotate or pivot the ring when desired in order to move the ring to its unlocked position, i.e., where the lugs 14B enable the legs of the optical sighting instrument to be inserted or removed from the openings 15 in body member 12A.

The pivot point of the locking ring is the vertical pin 17 as described above. For example, the pin 17 may be secured to the underside of the locking ring and may be received in a recessed opening in member 19. The spring 21 urges the locking ring toward its normal locked position such that the lugs on the ring are urged against the legs of the sighting device supported on the tribrach. Thus, the legs are always locked in position until the workman grasps one of the handles or levers and pivots the locking ring in a direction against the force of the spring.

The tribrach device includes a laser generator 20 such as a 670 nm diode laser which is secured in a recess or cavity in member 19. A prism 22 is also secured in member 19 directly in line with the centerline of the laser beam generator so that the laser beam is reflected from a horizontal plane to a vertical plane. This provides a laser beam which projects vertically upward and downward. Thus, the laser beam can be used to align the optical sighting instrument vertically over a ground marker or under a ceiling marker (e.g., in a tunnel or mine). The laser is battery powered and is activated by means of switch 16.

The lower body member 12B is attached to the upper body member 12a by means of three threaded bolts 23 each of which passes through an opening 12C in member 12B and is threadably received in opening 12D in body member 12A. The lower end 23A of bolt 23 is ball-shaped and fits into the complimentarily-shaped recess 12E. Set screw 28 holds bolt 23 in the upper end of recess 12E. Nut 24 is secured to bolt 23 by set screw 27. By rotating nut 24 on one or more of bolts 23, the attitude of body member 12A relative to body member 12B may be adjusted (e.g., to level body member 12A). Body member 12a includes a central opening 25 and body member 12B includes central opening 26 to enable the laser beam to be directed upwardly and downwardly through the tribrach device.

Figure 5:
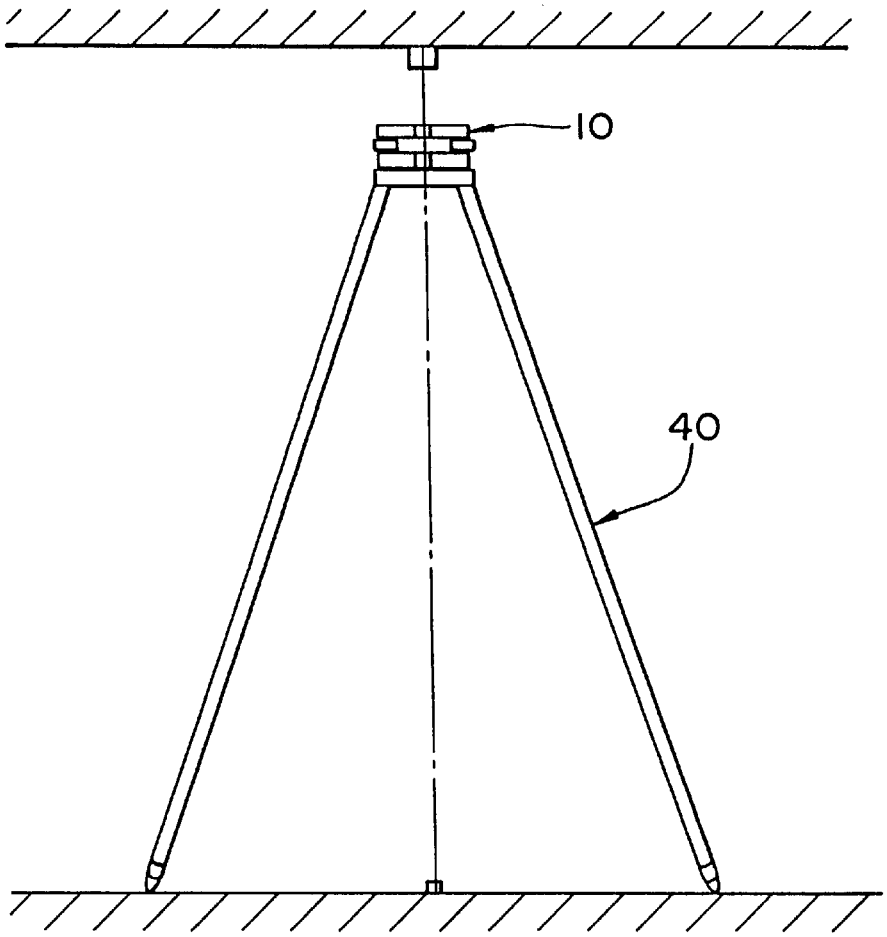
FIG. 5 illustrates use of the tribrach device in an underground environment.
Figure 6:
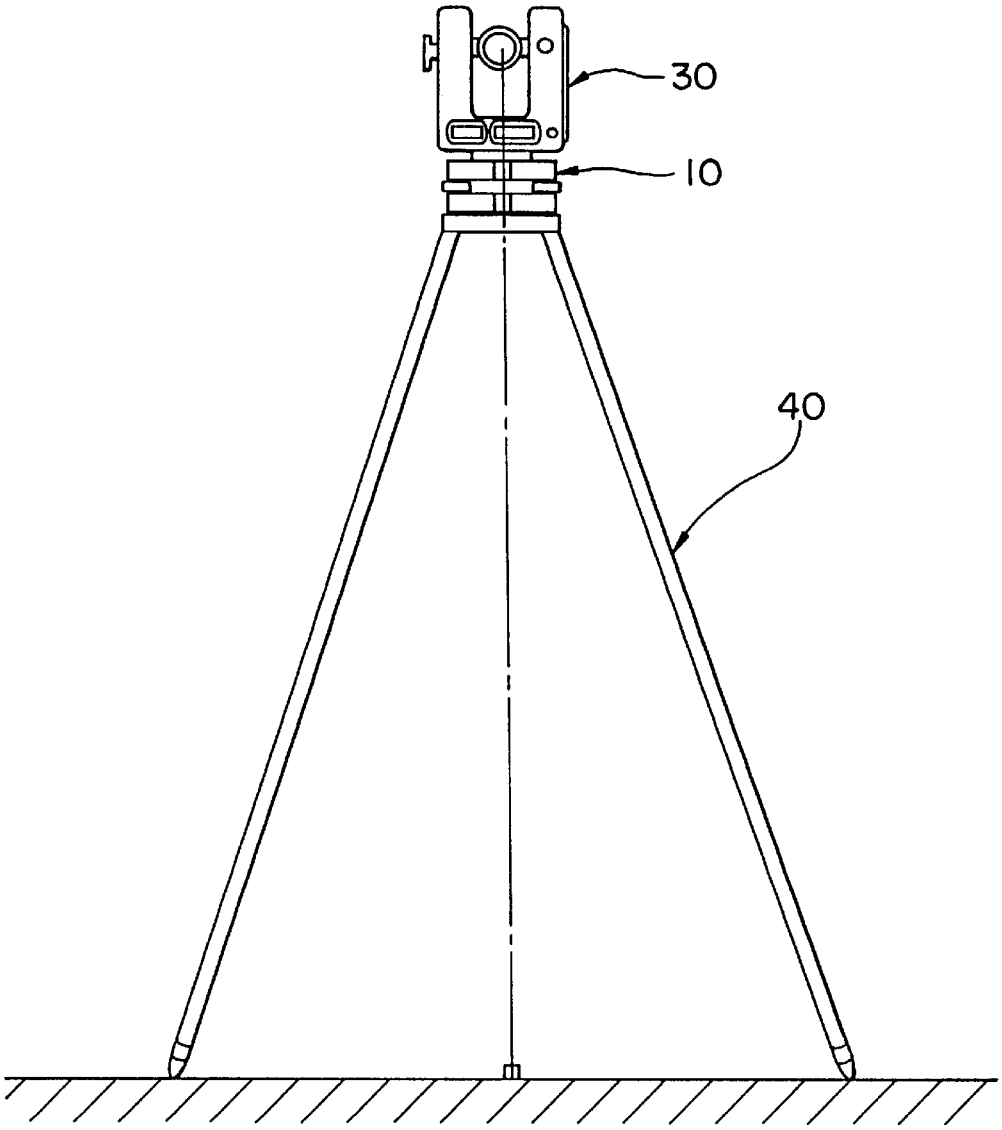
FIG. 6 is a side elevational view showing the tribrach device on the upper end of a tripod and supporting an optical sighting instrument.

The tribrach device can be used in a variety of situations, even during deteriorating weather conditions and depleted light. The tribrach can also be used in subsurface applications such as aqueducts, mines, caverns, tunnels and large underground utility lines. These applications utilize monuments and points of reference in the ceiling of the subsurface throughway. FIG. 5 illustrates use of the tribrach device on a tripod 40 in an underground environment. Any conventional instrument may be positioned on and attached to the tribrach device. FIG. 6 illustrates the use of the tribrach device on a tripod 40 for supporting a conventional optical sighting instrument 30.

Other variants are possible without departing from the scope of this invention.

What is claimed is:

1. A tribrach device comprising:

(a) an upper body member including a plurality of apertures extending vertically therethrough; and wherein said upper body member also includes a light beam opening extending vertically therethrough;

(b) a lower body member attached to said upper body member; wherein said lower body member includes a light beam opening extending vertically therethrough;

(c) a locking ring disposed between said upper and lower body members; wherein said locking ring includes a plurality of outwardly-extending lugs corresponding to the number and position of said apertures; wherein said locking ring is pivotable in a manner such that said lugs move between a locking position and a retracted position; wherein when said locking ring moves toward said retracted position said lugs move away from said apertures, and when said locking ring moves toward said locking position said lugs move toward said apertures; and further including biasing means for biasing said locking ring toward said locking position; and (d) a laser beam generator between said upper and lower body members for generating a visible light beam; and further including means for directing said light beam upwardly and downwardly along a vertical axis through said light beam openings in said upper body member and said lower body member.

2. A device in accordance with claim 1, wherein said means for directing said light beam upwardly and downwardly along said vertical axis comprises a prism which intersects said visible light beam from said generator.

3. A device in accordance with claim 1, further comprising a leveling bubble secured in said upper body member.

4. A device in accordance with claim 1, wherein there are three said apertures and three said lugs.

5. A device in accordance with claim 1, wherein said lugs are disposed beneath said apertures.

6. A device in accordance with claim 1, wherein said locking ring includes a plurality of outwardly-projecting handles.

7. A combination comprising:

(a) an optical sighting instrument having downwardly extending legs;

(b) a tribrach device comprising:

(i) an upper body member including a plurality of apertures extending vertically therethrough; and wherein said upper body member also includes a light beam opening extending vertically therethrough;

(ii) a lower body member attached to said upper body member; wherein said lower body member includes a light beam opening extending vertically therethrough;

(iii) a locking ring disposed between said upper and lower body members; wherein said locking ring includes a plurality of outwardly-extending lugs corresponding to the number and position of said apertures; wherein said locking ring is pivotable in a manner such that said lugs move between a locking position and a retracted position; wherein when said locking ring moves toward said retracted position said lugs move away from said apertures, and when said locking ring moves toward said locking position said lugs move toward said apertures and further including biasing means for biasing said locking ring toward said locking position; and (iv) a laser beam generator between said upper and lower body members for generating a visible light beam; and further including means for directing said light beam upwardly and downwardly along a vertical axis through said light beam openings in said upper body member and said lower body member;

wherein said legs of said instrument are received in said apertures and are secured by said lugs on said locking ring.

*8. A tribrach device comprising:*

*(a) an upper body member including a plurality of apertures extending vertically therethrough; and wherein said upper body member also includes a light beam opening extending vertically therethrough;*

*(b) a lower body member attached to said upper body member; wherein said lower body member includes a light beam opening extending vertically therethrough;*

*(c) a locking ring disposed between said upper and lower body members; wherein said locking ring includes a plurality of outwardly-extending lugs corresponding to the number and position of said apertures; wherein said locking ring is pivotable in a manner such that said lugs move between a locking position and a retracted position; wherein when said locking ring moves toward said retracted position said lugs move away from said apertures, and when said locking ring moves toward said locking position said lugs move toward said apertures; and further including biasing means for biasing said locking ring toward said locking position.*

*9. A device in accordance with claim 8, further comprising a leveling bubble secured in said upper body member.*

*10. A device in accordance with claim 8, wherein there are three said apertures and three said lugs.*

*11. A device in accordance with claim 8, wherein said lugs are disposed beneath said apertures.*

*12. A device in accordance with claim 8, wherein said locking ring further includes at least one handle projecting outwardly therefrom.*

*13. A device in accordance with claim 8, wherein said body members are composed of tempered aluminum.*

*14. A tribrach device comprising:*

*(a) an upper body member including a light beam opening extending vertically therethrough;*

*(b) a lower body member attached to said upper body member; wherein said lower body member includes a light beam opening extending vertically therethrough;*

*(c) a laser beam generator between said upper and lower body members for generating a visible light beam; and further including means for directing said light beam upwardly and downwardly along a vertical axis through said light beam openings in said upper and lower body members.*

*15. A device in accordance with claim 14, wherein said means for directing said light beam upwardly and downwardly along said vertical axis comprises a prism which intersects said visible light beam from said generator.*

*16. A device in accordance with claim 14, further comprising a leveling bubble secured in said upper body member.*

*17. A device in accordance with claim 14, wherein said body members are composed of tempered aluminum.*

*18. A tribrach device comprising:*

*(a) an upper body member including a light beam opening extending vertically therethrough;*

*(b) a lower body member attached to said upper body member; wherein said lower body member includes a light beam opening and a plurality of bolt openings extending vertically therethrough; wherein said lower body member is attached to said upper body member by means of a plurality of threaded bolts extending through said bolt openings; wherein each said bolt includes a ball-shaped end which is received in one of said bolt openings.*

*19. A device in accordance with claim 18, further comprising a leveling bubble secured in said upper body member.*

*20. A device in accordance with claim 18, wherein said body members are composed of tempered aluminum.*

*21. A device in accordance with claim 18, further comprising a laser beam generator between said upper and lower body members for generating a visible light beam; and further including means for directing said light beam upwardly and downwardly along a vertical axis through said light beam openings in said upper and lower body members.*

*22. A device in accordance with claim 21, wherein said means for directing said light beam upwardly and downwardly along said vertical axis comprises a prism which intersects said visible light beam from said generator.*

* * * * *